W. WITTNER.
RELIABLE ADJUSTABLE INSIDE INDICATOR GAUGE.
APPLICATION FILED DEC. 22, 1921.
1,431,615.
Patented Oct. 10, 1922.
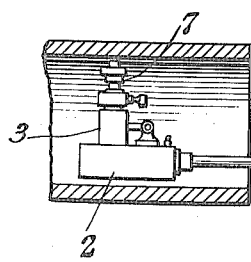
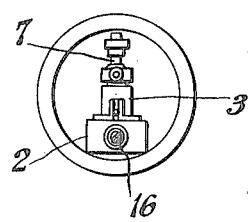
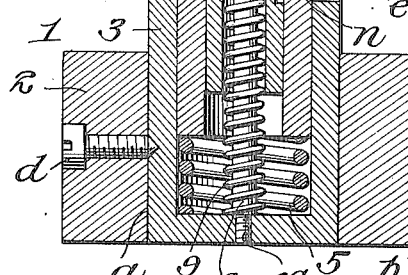
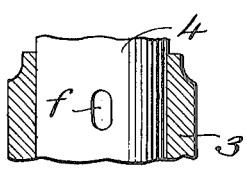
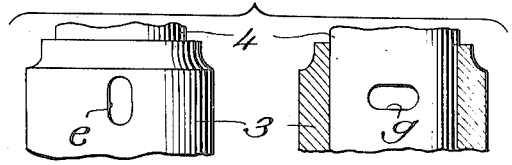
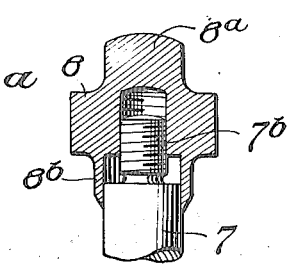
Inventor
Wm. Wittner
By E. B. Clark
Attorney

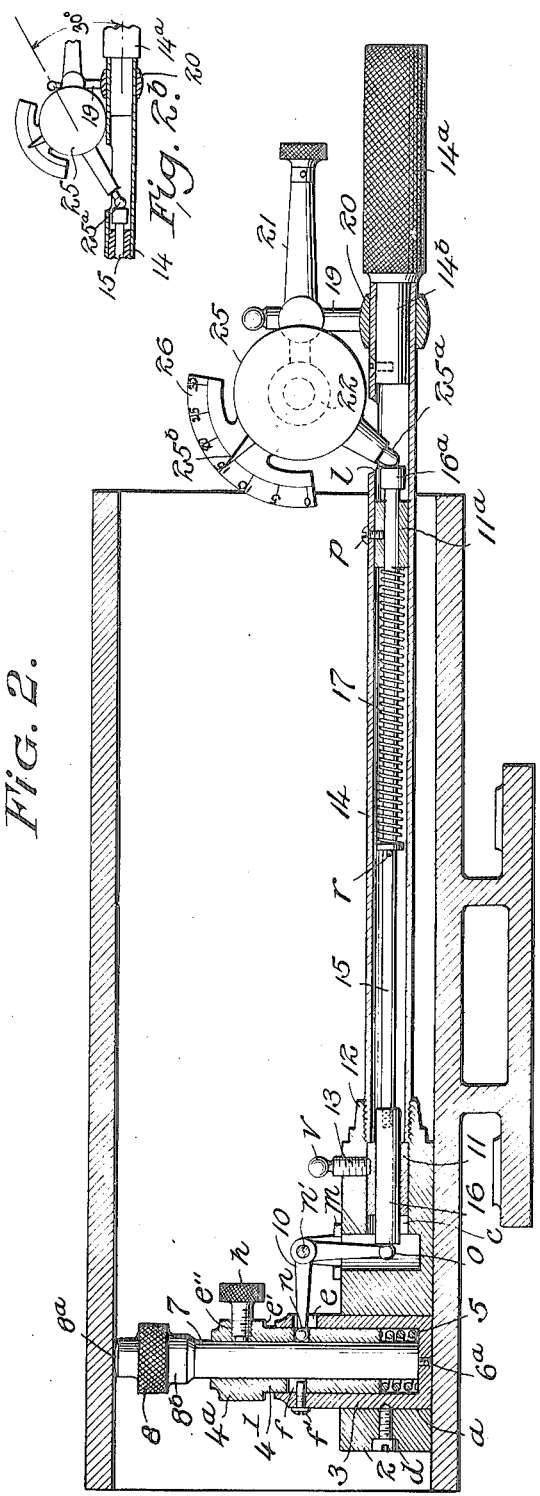

Patented Oct. 10, 1922.                                              1,431,615

UNITED STATES PATENT OFFICE.

WILLIAM WITTNER, OF JERSEY CITY, NEW JERSEY.

RELIABLE ADJUSTABLE INSIDE INDICATOR GAUGE.

Application filed December 22, 1921. Serial No. 524,251.

*To all whom it may concern:*

Be it known that I, WILLIAM WITTNER, a citizen of the United States, residing at Jersey City, in the county of Hudson and State of New Jersey, have invented certain new and useful Improvements in Reliable Adjustable Inside Indicator Gauges, of which the following is a specification.

This invention relates to an adjustable inside indicator gauge adapted to make tests and show any variations from exactly straight and parallel opposed surfaces in long or deep passageways where an inside micrometer caliper cannot be used because of the length and small diameter of the hole.

The object of the invention is to provide an instrument of simple construction with few parts, not liable to get out of order and adapted for quickly taking exact inside measurements of cylinders, slots, keyways and other openings, and for showing any variations from straight lines and any inequalities in opposed surfaces.

This instrument is an inspector's gauge and can be advantageously used in connection with universal grinding machines or lathes.

The matter constituting my invention will be defined in the claims.

I will now describe the details of construction of my improved gauge by reference to the accompanying drawings, in which:

Figure 1 represents a vertical section, on enlarged scale, of part of the gauge, the handle and indicator being omitted.

Figs. 1$^a$ and 1$^b$ represent sectional detail views.

Fig. 2 represents a sectional elevation of the instrument inserted in a rectangular passageway to be tested.

Fig. 2$^a$ represents a sectional detail view.

Fig. 2$^b$ represents a view on reduced scale, showing the test indicator set at the proper angle with reference to a push rod.

Fig. 3 represents a top plan view with parts in section.

Fig. 3$^a$ represents a fragmentary detail view.

Fig. 4 represents a sectional side elevation, showing the instrument in a cylinder.

Fig. 4$^a$ represents an end view of the same.

In constructing this adjustable inside gauge 1 I provide a rectangular base block 2 having recesses $a$, $b$, $c$ for holding different parts of the instrument. This block is made with a flat bottom as indicated in the drawing and best shown in Fig. 4$^a$. In the recess $a$ is placed a supporting cylinder 3, which is held in place by a screw $d$ through a wall of the base, and is provided with a vertical slot $e$ near the top for an arm of a bell crank lever 10. Into cylinder 3 is fitted a vertical reciprocating sleeve 4 having an enlarged head 4$^a$, providing an annular shoulder $e'$. A short vertical movement of sleeve 4, about five hundredths of an inch, is provided between said shoulder and the top of the cylinder 3. The head is also provided with an opening $e''$ for a lock screw $h$. The sleeve has at about its middle portion a short vertical slot $f$ for receiving a guide pin $f'$ passing through the cylinder 3, and on the opposite side with a transverse slot $g$ for engagement of the end of a bell crank lever. The vertical slot $f$, Fig. 1$^a$, is of the correct height to permit the above mentioned vertical movement in connection with the guide pin $f'$. In the bottom of cylinder 3 is placed a short helical compression spring 5 adapted to bear upon the lower end of the sleeve 4, as shown in Fig. 1. Centrally in the cylinder 3 is fixed a guide rod 6 by means of its extension pin 6$^a$, the rod serving to support a long light helical spring 9. The reciprocating plunger 7 has a longitudinal passage 7$^a$ in its lower half for receiving the actuating spring 9, and is of a diameter to work easily in the sleeve, and of a length to project about one-quarter of its length above the top of the sleeve. It is provided at its upper end with a reduced screw threaded extension 7$^b$ providing an annular shoulder around it. A longitudinal guide groove $k$ is made in the plunger for a brake pin $i$ adapted to be operated by the lock screw $h$.

An adjustable contact nut 8, having an upper contact extension 8$^a$ and a lower sleeve extension 8$^b$, is applied to the threaded extension 7$^b$ of the plunger and can be adjusted upward and downward to vary the length of the plunger. Plungers of different lengths may be made and used interchangeably in this gauge to adapt it for gauging openings or holes of different diameters. The portion of the nut 8 having the greatest diameter is, preferably, knurled, as indicated in Fig. 2. The lock screw $h$ works in a threaded opening $e''$ and has a longitudinal opening in which is fitted a headed brake pin $i$ which is adapted to enter the guide groove $k$ of the plunger for guiding it and holding it in a fixed position. On the base is secured by screws a plate $m$ and short posts $m'$, in the latter of which is pivoted by pin $n'$ a bell crank contact lever 10, having at the end of its upper arm a ball $n$ and at the end of its lower arm a ball $o$ in the recess $b$. The ball $n$ works in the slot $g$ in sleeve 3 and the ball end $o$ is in position to make contact with the end piece 16 of push rod 15. In the recess $c$ is fitted a bushing 11 having a longitudinal opening for the contact piece 16 of rod 15. An internally threaded sleeve 12 is a part of or is secured to the end of the base 2 at the mouth of recess $c$ and receives the threaded end of the long hollow handle 14. The bushing 11 is secured in place by a set-screw 13, having a rounded head $v$ and an neck for engaging with the eye of a rod 23. Near the outer end of the handle is secured a second hollow bushing $11^a$ by a screw $p$ for the push rod 15. This rod is screwed into an opening in the contact piece 16 and is supported in the bushing $11^a$, and has an outer contact head $16^a$. The rod is also provided with a stop pin $r$ as a bearing for a helical spring 17, which bears at its opposite end against the bushing $11^a$. The handle has an open slot $l$ above the head $16^a$ for admitting the contact pin of a test indicator 25. A filling block $14^b$ is secured in the outer end of the hollow handle and has secured to it a knurled head $14^a$. On the part of the handle containing block $14^b$ is placed a sliding collar 20 having a set screw $t$. The collar may slide about one-half inch on the handle for adjusting the indicator inward or outward.

To the side of the collar is secured an arm 18, Fig. 3, to which is connected a post 19 which supports the holder 21 having a perforated head 22 for clamping the indicator 25 in place. This indicator is provided with a contact pin $25^a$ and a pointer hand $25^b$ which traverses the scale plate 26.

The indicator is preferably set with its contact pin $25^a$ at an angle of 30° to the horizontal or to the handle 14, so that said pin may be readily pushed inwardly by the push rod 15, as indicated by Fig. $2^b$. This indicator is made the subject of my co-pending application Serial Number 524,250, filed this date. The contact pin $25^a$ is in position to make contact with the head $16^a$ of push rod 15 and to be actuated by said rod. The rod 23 is engaged by its eye $x$ with the neck of set-screw 13, and has an outer head $23^a$. This rod may be used for sliding the gauge into and out of a hole.

The manipulation and use of this gauge will be understood by a machinist. In order to test a hole or slot to determine whether it is straight and whether there are inequalities in the opposed surfaces, the gauge is pushed a short distance into the hole or slot and then the plunger 7 is quickly released by turning lock screw $h$ and is then locked by closing the screw upon the inner head of the break pin $i$, then compress or force the test gauge sleeve 4 by turning outward the extension nut 8 till the plunger 7 is tight, then set the indicator hand to zero or any graduation on the index scale which shows the thousandth of an inch, slide the instrument as far as possible into the opening or bore and note the movement of the pointer hand on the scale plate. This will indicate any variations from a straight line and uneven opposed surfaces. The gaging operation can be quickly performed and will be exactly indicated.

Though I have for convenience shown a test indicator mounted on the handle of the instrument, I wish it understood that I may mount it in other convenient positions to be actuated by a push rod in connection with a gauge.

The instrument may be modified in various details of construction without departing from the spirit and scope of my invention.

Having described my invention, what I claim and desire to secure by Letters Patent is:

1. The combination with a holding cylinder, of a spring-pressed sleeve therein, a plunger in said sleeve, a spring adapted to force said plunger out of said sleeve, means for locking said plunger in a fixed position in said sleeve, a push rod, means for connecting it with said sleeve whereby movements of the sleeve will be imparted to the rod.

2. The combination with a holding cylinder, of a reciprocating sleeve therein, a spring adapted to press on the lower end of the sleeve, a plunger in said sleeve and a spring adapted to force the plunger outward, adjustable means for locking the plunger to the sleeve, a pivoted bell crank lever engaging with the sleeve, and a longitudinal push rod adapted to make contact with an arm of said bell crank, whereby movements of the sleeve will be imparted to the rod.

3. The combination with a holding cylinder, of a reciprocating sleeve having a slot in its wall located in said cylinder, an operating spring for the sleeve, a slidable plunger in the sleeve, a spring for forcing the plunger outward, adjustable means for guiding and locking the plunger in the sleeve, a pivoted bell crank lever having the end of one arm engaging in said slot in the sleeve, a longitudinally spring-pressed push rod adapted to make contact with the other arm of said bell crank for showing motion of the sleeve and the contained plunger.

4. The combination with a holder, of a slidable plunger therein, a spring adapted to force the plunger outward, said plunger having at its upper end an adjustable extension nut adapted to make contact with a surface to be gauged, a longitudinal push rod, and means connecting with said plunger adapted to actuate said rod.

5. The combination with a holding cylinder, of a reciprocating sleeve therein, a spring adapted to force the sleeve outward, a slidable plunger in the sleeve, a spring adapted to force the plunger outward, means for locking the plunger to the sleeve, a pivoted bell crank lever engaging, by one arm with the sleeve, a longitudinal spring-pressed push rod positioned to make contact with the other arm of said lever, and a test indicator having a contact pin in position to make contact with the outer end of said rod.

6. The combination with a holding cylinder, of a reciprocating sleeve therein, a spring adapted to force the sleeve outward, a slidable plunger in the sleeve, a spring adapted to force the plunger outward, means for locking the plunger to the sleeve, a pivoted bell crank lever engaging by one arm with the sleeve, a long hollow handle connecting with the cylinder, a longitudinal push rod in the handle, a spring adapted to press the rod inward, the rod being positioned to make contact with the other arm of said bell crank lever, a test indicator mounted on the handle and having a contact pin in position to make contact with the outer end of said push rod.

7. The combination with a base block having recesses, of a holder in one recess, a spring-pressed reciprocating sleeve in the holder, a reciprocating spring-pressed plunger in the sleeve, means for locking the plunger to the sleeve, said sleeve having a slot in its wall, posts secured to the base, a bell crank lever pivoted thereto and having one arm engaging with said slot and the other arm projecting down into a recess in the base, a push rod in position in the case to make contact with the lower arm of said lever, and a rod engaging with the base.

8. The combination with a holder, of a spring pressed sleeve therein, of a plunger in said sleeve, a spring adapted to force said plunger out of said sleeve, means for locking said plunger in said sleeve, a push rod, means for connecting it with said sleeve, whereby movement of the sleeve will be imparted to the rod, and a test indicator in position to be actuated by said push rod.

9. The combination with a holder and a sleeve therein, of a spring pressed plunger in the sleeve, said sleeve having a threaded opening extending to the plunger, a lock screw having a longitudinal opening, a brake pin in the opening of said screw and in position to bear upon said plunger.

10. The combination with a holder, of a spring pressed sleeve therein, said sleeve having a vertical slot, a pin in the wall of the holder engaging with said slot to limit the movement of the sleeve, a slidable spring pressed plunger in said sleeve, said plunger having at its upper end an adjustable extension nut adapted to make contact with a surface to be gauged, and means for locking the plunger to the sleeve.

In testimony whereof I affix my signature in presence of two witnesses.

WILLIAM WITTNER.

Witnesses:
CHAS. W. BRUGER,
RICHARD GABRIELSKY.